(12) United States Patent
Chen et al.

(10) Patent No.: US 8,032,029 B2
(45) Date of Patent: Oct. 4, 2011

(54) FOUR WAVE MIXING SUPPRESSION

(75) Inventors: Li-Ping Chen, San Jose, CA (US); Paul Meyrueix, Santa Clara, CA (US); Wei Huang, San Jose, CA (US)

(73) Assignee: Harmonic Inc., Sunnyvale, CA (US)

( * ) Notice: Subject to any disclaimer, the term of this patent is extended or adjusted under 35 U.S.C. 154(b) by 780 days.

(21) Appl. No.: 12/034,486

(22) Filed: Feb. 20, 2008

(65) Prior Publication Data
US 2009/0208223 A1 Aug. 20, 2009

(51) Int. Cl.
*H04J 14/08* (2006.01)
(52) U.S. Cl. .......................... 398/95; 398/196
(58) Field of Classification Search .............. 398/95, 398/196
See application file for complete search history.

(56) References Cited

U.S. PATENT DOCUMENTS

| | | | | |
|---|---|---|---|---|
| 6,661,974 B1 * | 12/2003 | Akiyama et al. | ............... | 398/95 |
| 7,483,599 B2 * | 1/2009 | Kish et al. | ............... | 385/14 |
| 7,653,310 B2 * | 1/2010 | Sekine | ............... | 398/81 |
| 2008/0205882 A1 * | 8/2008 | Mutalik et al. | ............... | 398/7 |

* cited by examiner

*Primary Examiner* — Leslie Pascal
(74) *Attorney, Agent, or Firm* — Fish & Richardson P.C.

(57) ABSTRACT

Methods, systems and computer program products for countering the effects of four wave mixing are described. In one implementation, a controller can be used to shift an operating wavelength of an optical transmitter away from a zero-dispersion wavelength through which signals of the optical transmitter are transmitted. The controller can perform the shifting process while allowing sufficient margin for division multiplexing and minimal dispersion. The controller may determine an appropriate offset to be used for shifting the operating wavelength without subjecting the signals to a significant increase in undesirable effects such as dispersion, crosstalk and signal distortion which can impact the overall bit-error rate.

28 Claims, 8 Drawing Sheets

FOUR WAVE MIXING SUPPRESSION

TECHNICAL FIELD

The subject matter of this application is generally related to optical network.

BACKGROUND

Modern communication systems increasingly rely upon fiber optic networks to carry increasing amounts of data between networks and systems. For example, the use of multiple optical carriers (called channels) over a same optical fiber can increase signal bandwidth and capacity. Such communication systems include analog optical communication systems. The utilization of analog optical communication systems for analog applications previously associated with traditional technologies such as standard wire-based communication systems, and telephony and cable television (CATV) is driven in part by the increasing availability of broadband optical fiber networks in businesses and homes.

An analog optical communication system transmits an analog information signal over an optical fiber by modulating a carrier light beam with an information signal, and transmitting the modulated carrier over the optical fiber to an optical receiver. For long-distance applications, high optical power levels are needed to avoid the needs for compensational network components such as amplifiers and repeaters, which can substantially increase the overall cost and complexity for deploying the system.

However, the use of high optical power level (e.g., using a high-powered, narrow-linewidth optical source) in combination with the use of conventional optical fiber can lead to various non-linear effects that can cause signal degradation. Non-linear effects generally arise through interactions between optical carriers of relatively high power and the transmission medium through which the optical carriers are transmitted (e.g., optical fibers and other waveguides). One such non-linear effect includes four-wave mixing (FWM). FWM generally occurs between close, neighboring channels, and in optical fibers having low dispersion within the desired band (e.g., within the range of signal wavelengths).

Although FWM occurs generally in optical communication systems, FWM is most prevalent in high speed systems such as wavelength division multiplexing (WDM) systems and coarse WDM (CWDM) systems. FWM can place significant limitations on the deployment of these systems, and can degrade the desired signals being transmitted.

SUMMARY

Systems, methods, computer-readable mediums, user interfaces and other implementations are disclosed for compensating four wave mixing.

In some implementations, a method includes: retrieving a first wavelength; receiving an input specifying a second wavelength; determining a desired wavelength offset based on the first wavelength and the second wavelength; and controlling one or more optical parameters of an optical transmitter based on the offset.

In other implementations, a system includes: an optical transmitter for transmitting an optical signal, the optical transmitter including: a transmitter configured to generate an optical signal and transmit the optical signal through a transmission medium; and a controller configured to identify a zero-dispersion wavelength of the transmission medium; identify an operating wavelength of the optical transmitter; compare the operating wavelength with the zero-dispersion wavelength; determine, based on the comparison, a desired wavelength offset for shifting the operating wavelength away from the zero-dispersion wavelength; and determine whether the desired wavelength offset meets a predetermined criterion; and an optical receiver for receiving the optical signal through the transmission medium.

In other implementations, an optical transmitter includes: a controller configured to: identify a zero-dispersion wavelength of a transmission medium through which signals of the optical transmitter are transmitted; identify an operating wavelength of the optical transmitter; compare the operating wavelength with the zero-dispersion wavelength; determine, based on the comparison, a desired wavelength offset for shifting the operating wavelength away from the zero-dispersion wavelength; and control an output wavelength of the optical transmitter based on the desired wavelength offset.

In other implementations, a computer-readable medium having instructions stored thereon, which, when executed by a processor, causes the processor to perform operations comprising: a processor; a computer-readable medium operatively coupled to the processor and including instructions, which, when executed by the processor, causes the processor to perform operations comprising: identify a zero-dispersion wavelength of a transmission medium through which signals of an optical transmitter are transmitted; identify an operating wavelength of the optical transmitter; compare the operating wavelength with the zero-dispersion wavelength; determine, based on the comparison, a desired wavelength offset for shifting the operating wavelength away from the zero-dispersion wavelength; and control an output wavelength of the optical transmitter based on the desired wavelength offset.

In other implementations, a system comprising: means for identifying a zero-dispersion wavelength of a transmission medium through which signals of an optical transmitter are transmitted; means for identifying an operating wavelength of the optical transmitter; means for comparing the operating wavelength with the zero-dispersion wavelength; means for determining, based on the comparison, a desired wavelength offset for shifting the operating wavelength away from the zero-dispersion wavelength; and means for controlling an output wavelength of the optical transmitter based on the desired wavelength offset One or more advantages may include the following: A micro-controller may counter the effects of FWM by shifting the signal wavelength away from the zero-dispersion wavelength while allowing sufficient margin for division multiplexing and minimal dispersion. The micro-controller may determine an appropriate offset to be used for shifting the signal wavelength without subjecting the signals to a significant increase in undesirable effects such as dispersion, crosstalk and signal distortion which can impact the overall bit-error rate.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
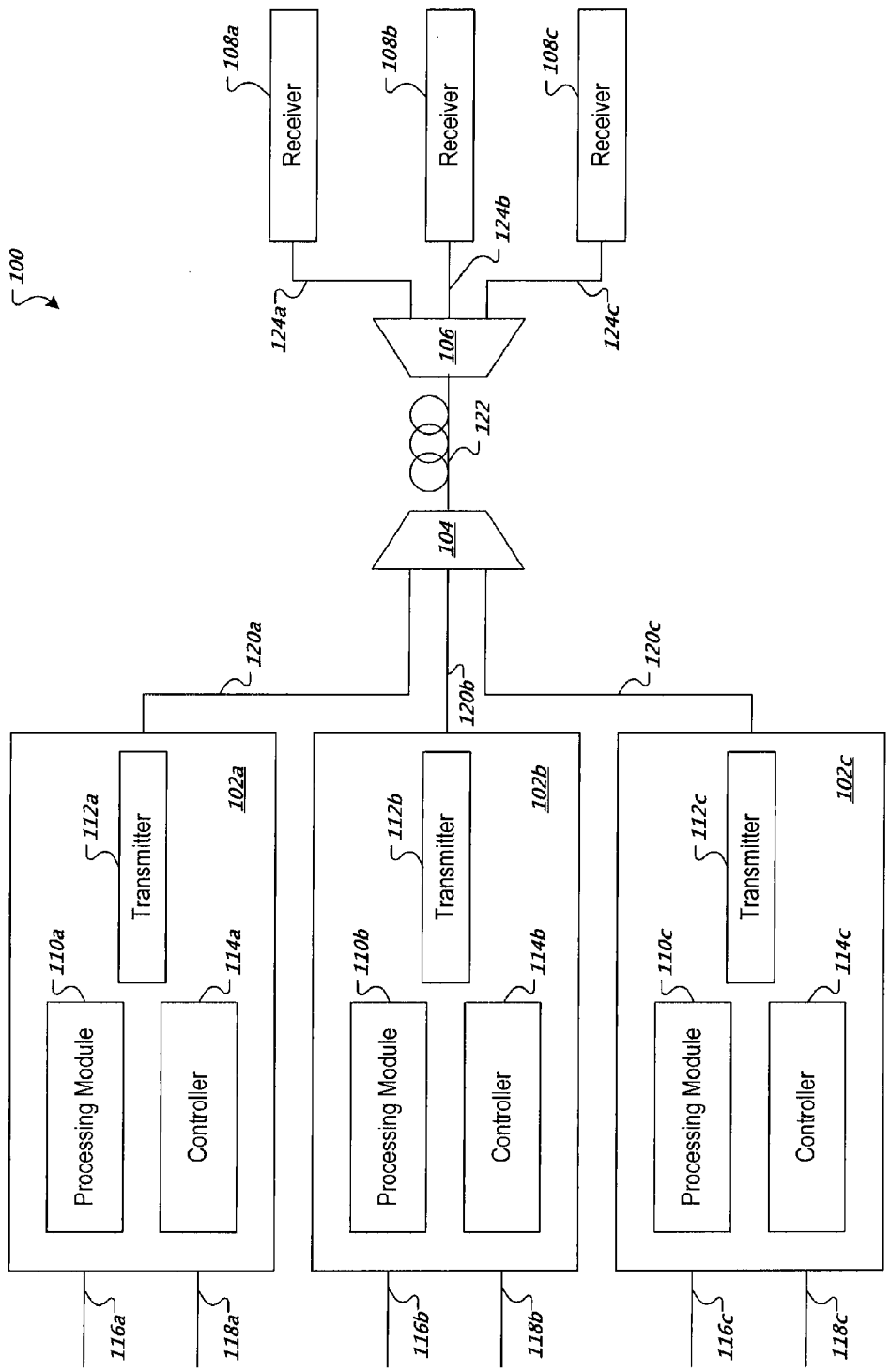
FIG. 1 depicts an example system for performing four-wave mixing suppression for fiber optic communications.

To satisfy increasing demands for information-handling capacity in optical fiber communication systems, various multiplexing schemes have been introduced and deployed. One multiplexing scheme includes wavelength division multiplexing (WDM). In WDM, multiple wavelength channels are combined on a single optical fiber. Typically, a respective optical source, such as a diode-pumped laser, is provided for each wavelength channel. A modulation device is provided for patterning the optical output from each such source. Alternatively, the sources are directly driven by modulated signals. Each wavelength channel contains an optical carrier frequency that has been modulated to encode information. Modulation causes data to be encoded on the optical carrier, and includes, for example, amplitude modulation, frequency modulation, and phase-shift keying. A wavelength channel has a finite frequency bandwidth which typically ranges from hundreds of MHz to tens of GHz.

Most of the conventional applications of WDM technology are focused on the non-zero dispersion wavelength at 1550 nm to avoid significant adverse consequences associated with non-linear effects. Non-linear effects arise through interactions between the transmission medium and optical channels of relatively high power and with small channel spacing. These effects are undesirable because they can lead to signal attenuation and performance degradation. Although these effects occur generally in optical communication systems, they are most prevalent in WDM systems.

Additionally, optical transmission at 1550-nm has two advantages. First, signal attenuation for standard, single mode optical fibers is at a minimum near the 1550-nm region. Second, efficient erbium doped fiber amplifiers, which are used in optical networks for amplifying signals with minimal signal distortion, also operate in the 1550-nm wavelength region.

Operating in the 1550-nm window, however, is generally undesirable for analog video applications that employ Hybrid Fiber/Coax (HFC) signaling as part of a mainline cable network. Particularly, while operating within the 1550-nm window can minimize adverse effects associated with conventional long haul applications as a result of large subscription coverage, single mode optical fibers with zero dispersion wavelength near 1310 nm experiences high dispersion at 1550 nm. This undesirable characteristic significantly limits the deployment of WDM technology in HFC architecture where only a limited portion of the available bandwidth is used for transmitting narrowcast signals.

To address this shortcoming, conventional solutions include the use of non-zero dispersion-shifted fibers (NZ-DSF) that can shift the zero-dispersion point to the 1550-nm region. NZ-DSF fibers with large effective areas can be used to obtain great capacity transmission over longer distance than would be possible with standard single-mode fibers. While NZ-DSF is effective in suppressing undesired dispersion and mitigating non-linear effect, as that can be troublesome at higher power levels, the deployment of NZ-DSF fibers is expensive and time consuming, and is not practical when a majority of analog transmitters used in HFC architecture operate in the 1310 nm.

There are many economical and commercial advantages to design optical networks based on 1310-nm WDM technology. For example, most of the commercial optical networks can take advantage of the low signal attenuation and low dispersion characteristics. One major limitation of the 1310-nm wavelength transmission is four wave mixing (FWM).

As discussed in the Background, FWM can impose serious performance constraint for high performance optical communication systems. FWM also can generate composite second order (CSO) distortion that is impressed upon the signal being transmitted. CSO is the peak of the average level of distortion products due to second-order non-linearity in fiber optic transmission systems.

Because FWM grows rapidly with increased power levels as high bit rates demand, FWM can limit the performance attainable by high bit rate communication systems. Moreover, even when optical fibers with selected dispersion characteristics (e.g., dispersion shifted fiber, non-zero dispersion shifted fiber, etc.) are used, FWM can place limits on channel density. In cases where fiber replacement is not possible, FWM can pose even greater difficulties to system efficiency.

In an effort to cope with an ever-increasing demand for higher capacity and speed, optical communication systems—namely, a WDM (wavelength division multiplexing) technique that can perform a large-capacity transmission at high speed—are being deployed. The WDM systems may be classified into DWDM (dense wavelength division multiplexing) systems and CWDM (coarse wavelength division multiplex) systems.

System Overview

FIG. 1 depicts an example system 100 for performing four-wave mixing suppression for optical communications. As shown, the system 100 includes three optical transmitters 102a-102c each configured to transmit signals of the same or different wavelengths. The system 100 also includes a multiplexer 104 (e.g., optical coupler) and a demultiplexer 106 (e.g., optical splitter). In some implementations, the multiplexer 104 may operate to combine signals received from the transmitters 102a-102c, while the demultiplexer may operate to separate a multiplexed signal into one or more demultiplexed signals. The system 100 also includes three optical receivers 108a-108c configured to received and process the demultiplexed signals from the demultiplexer 106. An optical receiver may include one or more photodetectors such as photodiodes, photomultipliers, phototransistors, etc. that are configured to detect an optical signal output from the demultiplxer 106 and to convert the detected optical signal to an electrical signal. The photodetector may be configured to generate a current whose magnitude corresponds to the optical power of the optical signal output.

While FIG. 1 illustrates three transmitters and three receivers, one of skill in the art would appreciate that the system 100 can include a greater or lesser number than those shown. One of skill in the art also would understand that the system 100 may be a bi-directional system which may incorporate transceivers as both transmitters and receivers. Depending on a particular design application, one or more attenuators, isolators, circulators, interleavers or wavelength filters also may be incorporated into the system 100.

Each optical transmitter 102a-102c may receive, as its input, an electrical signal, such as, without limitation, an RF signal, an analog signal or a digital signal. Using the electrical signal as an signal input, an optical transmitter 102a-102c may generate a corresponding optical output. The output may contain one or more optical signals of the same or different wavelengths that can travel through an optical medium 102a-102c to be combined at the multiplexer 104.

In some implementations, each optical transmitter 102a-102c may include a signal processing module, a transmitter, and a controller. For example, the optical transmitter 102a may include a signal processing module 110a, a transmitter 112a, and a controller 114a. Similarly, the optical transmitter 102b may include a signal processing module 110b, a transmitter 112b and a controller 114b, while the optical transmitter 102c may include a signal processing module 110c, a transmitter 112c and a controller 114c.

The optical transmitters 102a-102c may receive electrical signals at signal inputs 116a-116c, respectively. In some implementations, the signal inputs 116a-116c may receive analog and/or digital signals modulated at frequencies ranging from DC to radio-frequency (RF) or higher. The processing modules 110a-110c may process the electrical signals received at the signal inputs 116a-116c by performing, for example, noise removal or other filtering function.

The processing modules 110a-110c may be in communication with transmitters 112a-112c to provide an input to the transmitters 112a-112c. In these implementations, the processing modules 110a-110c may control one or more parameters of the input to the transmitters 112a-112c in response to signal inputs 116a-116c. For example, in response to signal input 116a, processing module 110a adjusts the intensity or frequency of transmitter 112a.

The transmitters 112a-112c also may be in communication with the controllers 114a-114c. In some implementations, the transmitters 112a-112c may include distributed feed-back (DFB) lasers, fabry-perot lasers and the like. The controllers 114a-114c may be computers, microcontrollers, programmable logic controllers (PLCs), programmable application controllers (PACs), or other devices that can be used to process data.

In certain implementations, a controller may transmit and/or receive data through a data port 118. For example, controller 114a may receive data through data port 118a, while controller 114b may receive data through data port 118b, and controller 114c may receive data through data port 118c. The data ports 118a-118c may be used to transmit and/or receive commands from a user or a computer system. As an example, the data ports 118a-118c may be in communication with one or more device interfaces (e.g., buttons, knobs, keys, graphical user interface (GUI), touch screen) which may allow a user to interact or communicate with the controllers 114a-114c.

In some implementations, a controller may include a micro-controller (not shown) which receives a signal input, and subsequently outputs a control signal. The control signal may be used to adjust one or more parameters of a transmitter's input wavelength prior to transmission. The parameters may include, for example, frequency, wavelength, power, amplitude and offset of a signal wavelength or between wavelengths. One of skill in the art would understand that these parameters are exemplary, and are not limiting in nature.

The micro-controller may include a library or database for storing, for example, known values or ranges of dispersion-zero wavelengths for commercially available optical fibers (e.g., a dispersion shifted fiber having a zero dispersion wavelength at 1550-nm, or having a zero-dispersion range of 1530-nm to 1570-nm). The database also may be configured to receive and store user specified values of such related wavelengths and ranges. The database may be integrated with the micro-controller (e.g., cache, memory, etc.), or alternatively, may be formed as a separate component of the micro-controller.

Figure 2A:
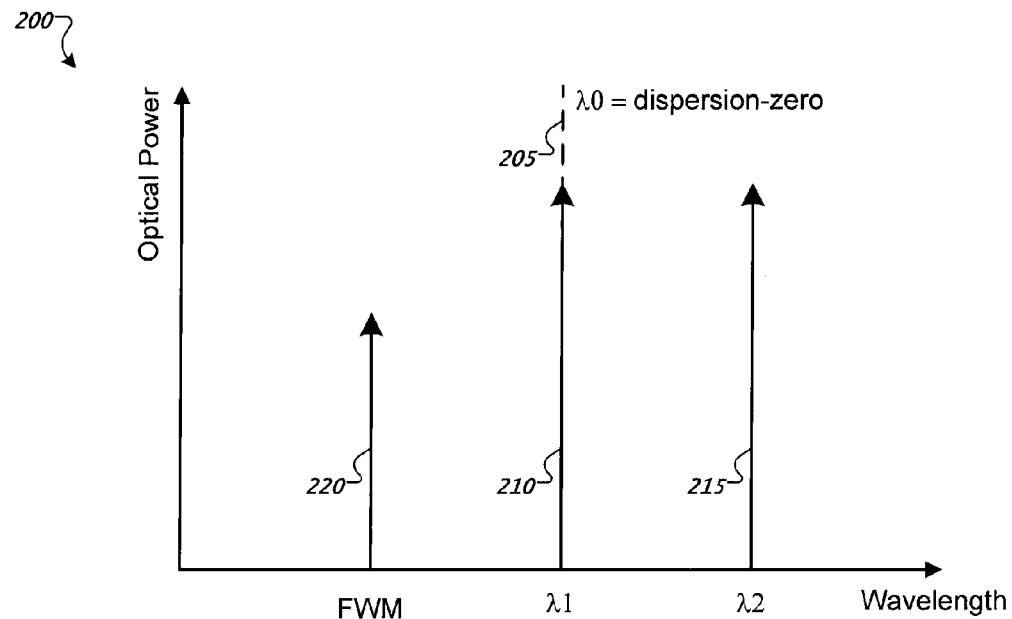
FIGS. 2A and 2B depict graphs that illustrate example four wave mixing near a fiber zero dispersion wavelength.

As discussed in the background, non-linear effects such as FWM generally arise through interactions between operating wavelengths and the transmission medium. In certain instances, FWM becomes pronounced when the operating wavelength is aligned with the zero-dispersion wavelength of the transmission medium. FIG. 2A depicts a graph 200 illustrating this phenomenon.

As shown in FIG. 2A, graph 200 depicts the relative wavelengths and frequencies of two example optical signals, including signal 210 at a first wavelength λ1 and signal 215 at a second wavelength λ2. When wavelengths λ1, λ2 interact in a nonlinear medium, the scattering of incident photons inside the nonlinear medium gives rise to another wavelength. FWM degrades the performance of WDM systems, where multiple optical wavelengths are spaced at equal intervals or channel spacing. FWM creates a new wavelength which can destructively interfere with other signal wavelengths. Such an interference can cause undesirable optical crosstalk and distortion to the signals being transmitted, which may lead to signal degradation and system degeneration. As shown, the effects of FWM become even more pronounced when the wavelength of signal 210 aligns with the zero dispersion wavelength λ0 of the transmission medium.

Accordingly, in one implementation, the micro-controller may counter the effects of FWM by shifting the signal wavelength away from the zero-dispersion wavelength while allowing sufficient margin for division multiplexing and minimal dispersion. The micro-controller may determine an appropriate offset to be used for shifting the signal wavelength without subjecting the signals to a significant increase in undesirable effects such as dispersion, crosstalk and signal distortion which can impact the overall bit-error rate.

To determine the degree of offset to be used for shifting the operating wavelength away from the zero-dispersion wavelength, the micro-controller may first identify the zero-dispersion wavelength of the transmission medium through which the signals are being transmitted. In some implementations, the micro-controller may retrieve this parameter from a pre-stored library or database as discussed above. Concurrently and subsequently, the micro-controller may prompt the user for the operating wavelength. In one implementation, the operating wavelength is the wavelength to be used for WDM transmission.

Next, the controller may compare the operating wavelength against the zero-dispersion wavelength. If there is a match between both parameters, the micro-controller may estimate a desired wavelength offset that can be used to prevent the operating wavelength from aligning with the zero-dispersion wavelength. In some implementations, the wavelength offsets can be determined empirically, for example, based on system performance resulting from the offsets.

In one implementation, the micro-controller may prompt the user to enter pass or failed information. The pass or failed information may be based upon a specific measurement result. The specific measurement result may indicate an estimated offset to be used for FWM suppression. The specific measurement result may be determined by considering one or more design parameters. Alternatively, an algorithmic model (e.g., an iterative model) may be developed and refined empirically based on an observed rate of system degradation to identify a suitable offset. The user may interrupt the model, and perform modification to or manual override any of the empirical result to build a model that suits a particular design application.

If the estimated offset is desirable as determined by the user, the user may communicate with the micro-controller (e.g., using a data port) that the estimated offset is satisfactory. The user also may instruct the micro-controller to use the estimated offset as the degree for shifting the operating wavelength. In response, the micro-controller may control its associated transmitter to effectuate the offset. If the estimated offset does not, for example, meet one or more design parameters, then micro-controller may continue to identify one or more offsets until a point at which the estimated offset meets a required performance or parameter.

As discussed previously, the micro-controller may include a library or database for storing, for example, known values or ranges of dispersion-zero wavelengths for commercially available optical fibers. In one implementation, the library or database also may include a table comprising a list of discrete wavelength offset. The table also may include other parameters such as, without limitation, operating wavelengths, zero-dispersion values, associated crosstalk and bit error rate and the like. A user may add or modify to the table as desired. In this implementation, the micro-controller can access the table to retrieve a wavelength offset appropriate for a specific criterion or criteria.

In other implementations, a controller may include a temperature controller, power/amplitude controller or the like. The controller may operate to match a resonant wavelength of its associated transmitter $112a$-$112c$ to the wavelength of an input wavelength by changing the refractive index of the transmitter $112a$-$112c$ to substantially match the resonant wavelength of the transmitter $112a$-$112c$ and the input wavelength. The controller may change the refractive index of the optical transmitter by, for example, controlling the operating temperature of the transmitter or changing the bias current supplied to the transmitter. The processing module may measure a parameter of the transmitter, such as the bias current through the transmitter or the optical power from the transmitter, to provide a feedback signal to the controller to determine when the resonant wavelength of the transmitter and the wavelength of the input wavelength are substantially matched.

Each transmitter $112a$-$112c$ may generate one or more optical signals of the same or different wavelengths. The controllers $114a$-$114c$ may communicate with the optical transmitters $112a$-$112c$ to control one or more operating parameters of the optical signals (e.g., power, frequency, channel widths, etc.). For example, the optical transmitter $112a$ may initially produce a laser output with a wavelength of 1311.0 nm, but a user may send a command, through the data port $118a$, to the controller $114a$. The command may subsequently cause the controller $114a$ to adjust the input to the optical transmitter $112a$ to produce a laser output with a wavelength of 1311.2 nm. One of ordinary skill in the art would appreciate that the controllers $114a$-$114c$ also may communicate with the processing modules $110a$-$110c$ for controlling the input of each individual transmitter $112a$-$112c$.

As discussed above, wavelength outputs by the transmitters $112a$-$112c$ may be adjusted to minimize FWM effects. In these implementations, the wavelength of each output signal may be adjusted by shifting one or more output signal wavelengths away from the fiber zero dispersion wavelength of the optical medium through which the signal travels. The transmitters' outputs may be transmitted to the multiplexer 104 through a same or another set of optical fibers $120a$-$120c$. Each optical fibers $120a$-$120c$, 122 and $124a$-$12c$ may be a nonlinear medium designed and optimized to broaden a spectrum to cover a target band, such as, without limitation, the C-Band, L-Band, S-Band or combinations thereof. Also, although not shown for sake of brevity, one or more optical repeaters such as optical fiber amplifiers (e.g., Erbium-Doped Fiber Amplifiers, optical switches, add/drop devices may be implemented into the system 100.

The multiplexer 104 may multiplex output signals from optical transmitters $102a$-$102c$ into a multiplexed signal, and transmit the multiplexed signal through optical fiber 122 to the demultiplexer 106. The demultiplexer 106 may demultiplex the multiplexed signal into one or more demultiplexed signals, and transmit each demultiplexed signal through one of optical fibers $124a$-$124c$ to a respective optical receiver $108a$-$108c$, respectively.

Figure 2B:
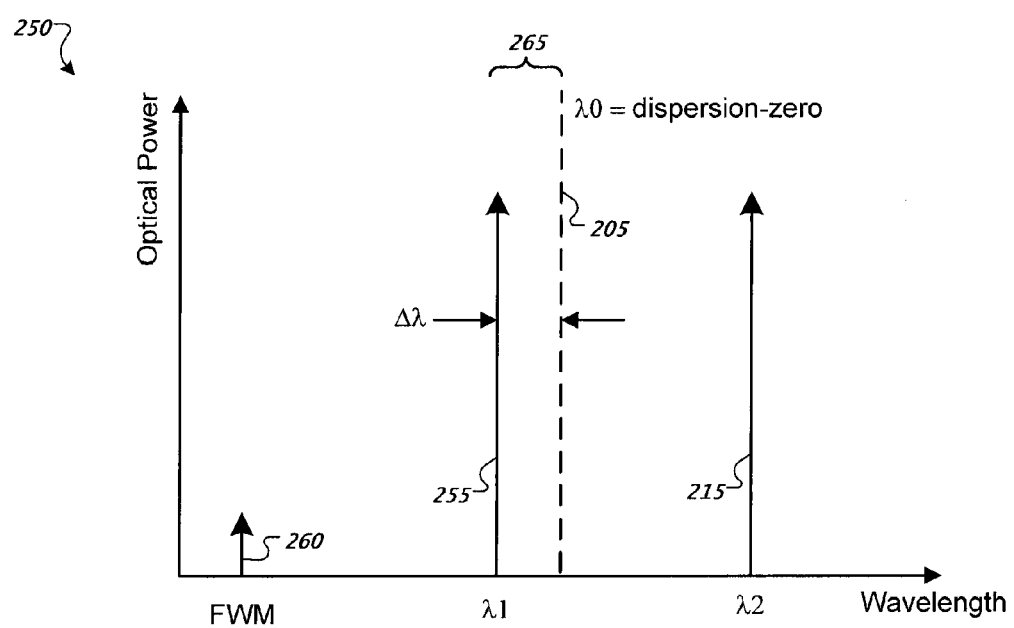

FIG. 2B depicts a graph 250 illustrating an example for suppressing four wave mixing near a fiber zero dispersion wavelength 205. The graph illustrates the same optical signal 215 but with a different signal 255 having a wavelength $\lambda 3$. The presence of optical signal 215 and the optical signal 255 produce a FWM signal 260. Unlike optical signal 210 shown in FIG. 2A, optical signal 255 is transmitted at a wavelength that is shifted away from the fiber zero dispersion wavelength by a wavelength difference 265. By shifting the wavelength of the signal 255 away from the wavelength of the fiber zero dispersion wavelength by the wavelength difference 265, the optical power of the FWM signal 265 is relatively reduced when compared to the optical power of the FWM signal 220. In some implementations, the wavelength of the signal may be shifted by, for example, adjusting the operating temperature of the transmitter $112a$-$112c$ or changing the bias current supplied to the transmitter $112a$-$112c$.

Figure 3:
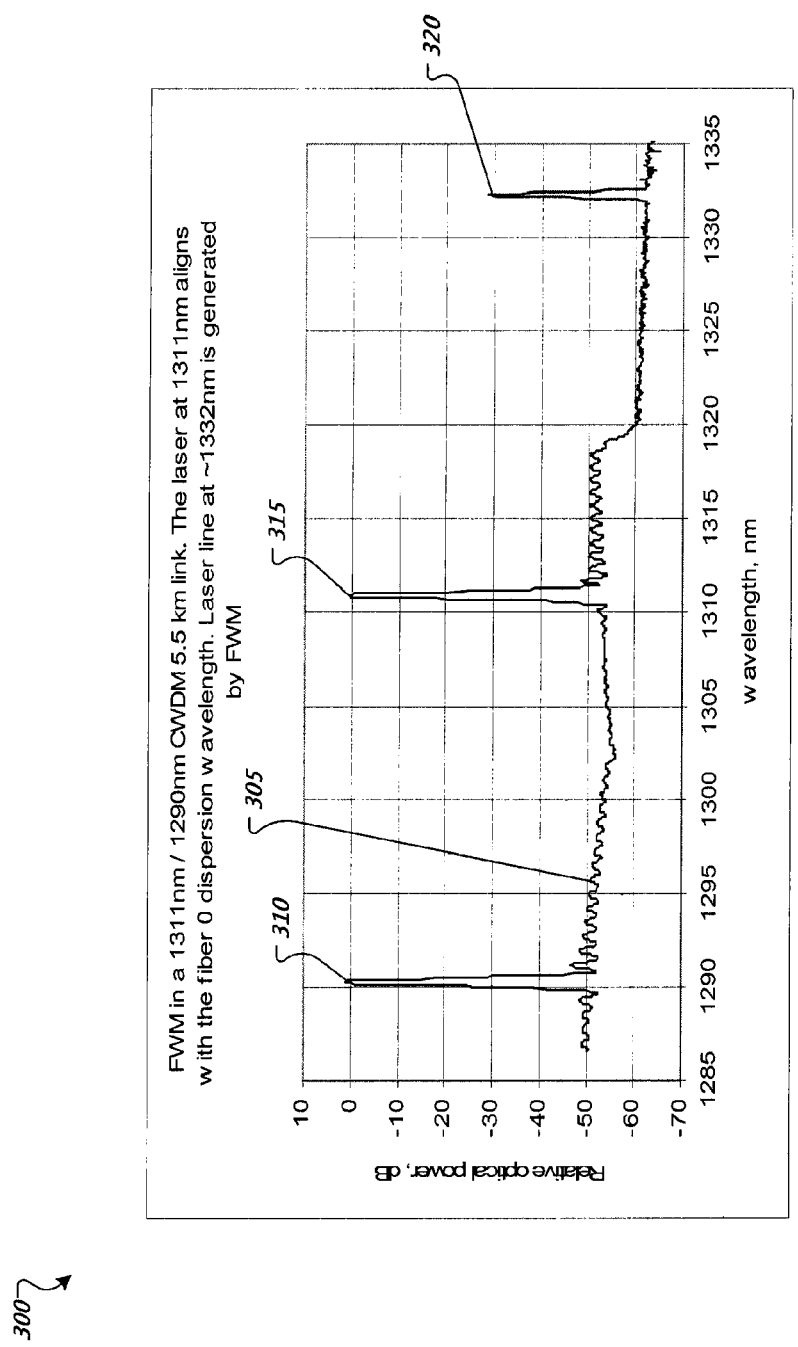
FIG. 3 depicts a graph that illustrates an example experimental result of four wave mixing.

FIG. 3 depicts a graph 300 illustrating an example experimental result of four wave mixing as a result of wavelength shifting. The graph 300 shows a curve 305 that includes an output peak 310, an output peak 315, and an output peak 320. The FWM efficiency can be a function of phase matching. For example, FWM efficiency can be substantially maximized under the degenerate case when one wavelength is at the zero dispersion wavelength. In another example, FWM efficiency decreases as the wavelength is shifted away from the zero dispersion wavelength. The output peak 310 is produced by a laser output at a wavelength of 1290 nm, whereas the peak output 315 is produced by a laser output at a wavelength of 1311 nm. The output peak at approximately 1332 nm is generated as a result of FWM.

Figure 4:
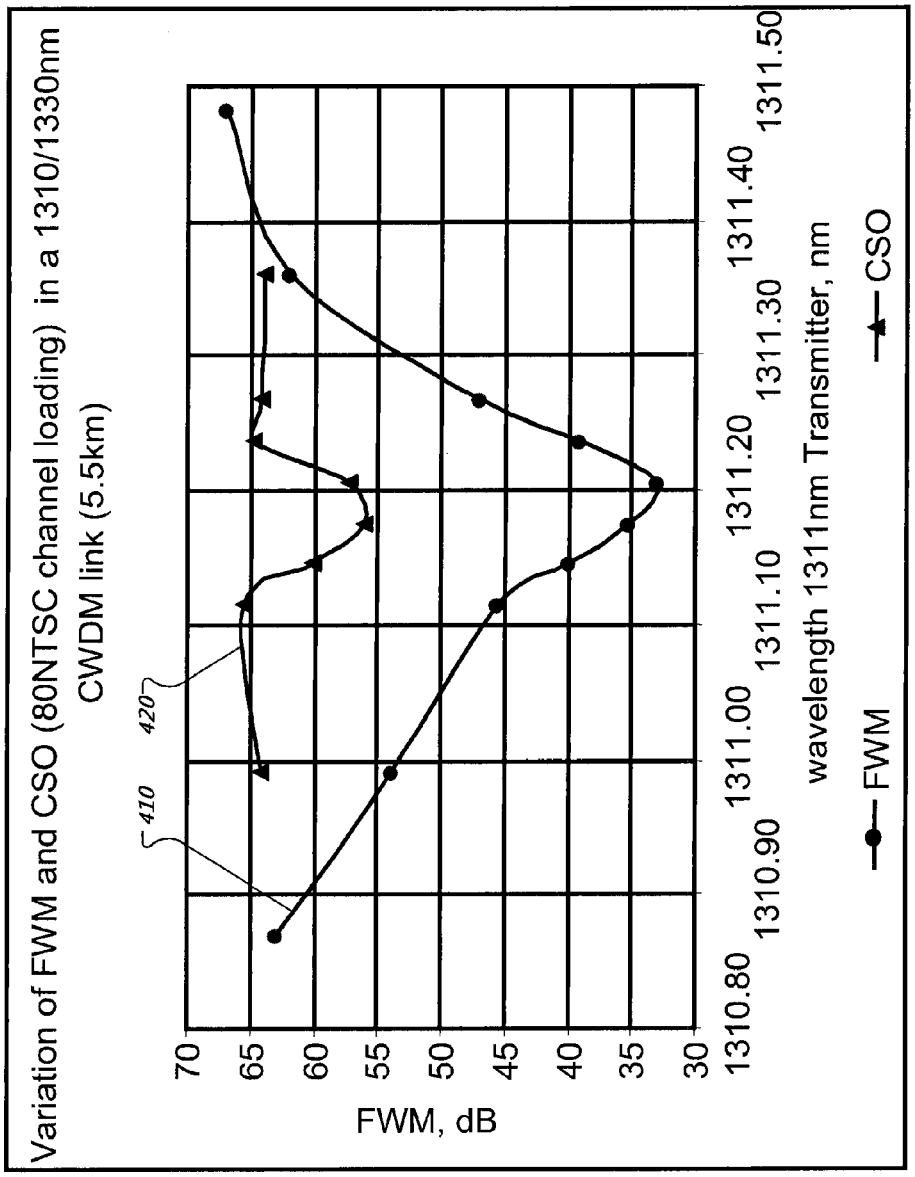
FIG. 4 depicts a graph that illustrates an example relationship between optical wavelengths and composite second order distortion.

FIG. 4 depicts a graph 400 that illustrates an example relationship between optical wavelengths and CSO distortion. The graph 400 includes a wavelength curve 410 that depicts the strength of an optical signal (e.g., the optical signal 255 of FIG. 2B) as the signal's wavelength is varied. In the illustrated example, the optical signal is transmitted through a length (e.g., 5.5 km) of optical cable that has a zero distortion wavelength of approximately 1311.2 nm.

The graph 400 also includes a CSO performance curve 420. The CSO performance curve 420 depicts CSO distortion levels at various wavelengths. As the wavelength of the optical signal of the curve 410 is varied, the optical signal interacts with other optical signals in the optical cable to produce various levels of CSO distortion. The CSO performance curve 420 shows a CSO distortion level of approximately 56 dB at the cable's zero dispersion wavelength of approximately 1311.2 nm. However, the CSO performance curve 420 also indicates that CSO distortion can be improved by varying the optical signal's wavelength away from the zero dispersion wavelength. In the illustrated example, CSO distortion can be improved by approximately 8 dB by altering the transmission wavelength by one or two nanometers.

In some implementations, the offsets used to reduce CSO may be known in advance and recalled later to tune an optical communications system. For example, in a 1290 nm, 1310 nm, and 1330 nm WDM application, an operator may use of two or three predetermined offsets to improve signal performance without having to perform elaborate testing and fine tuning.

Figure 5:
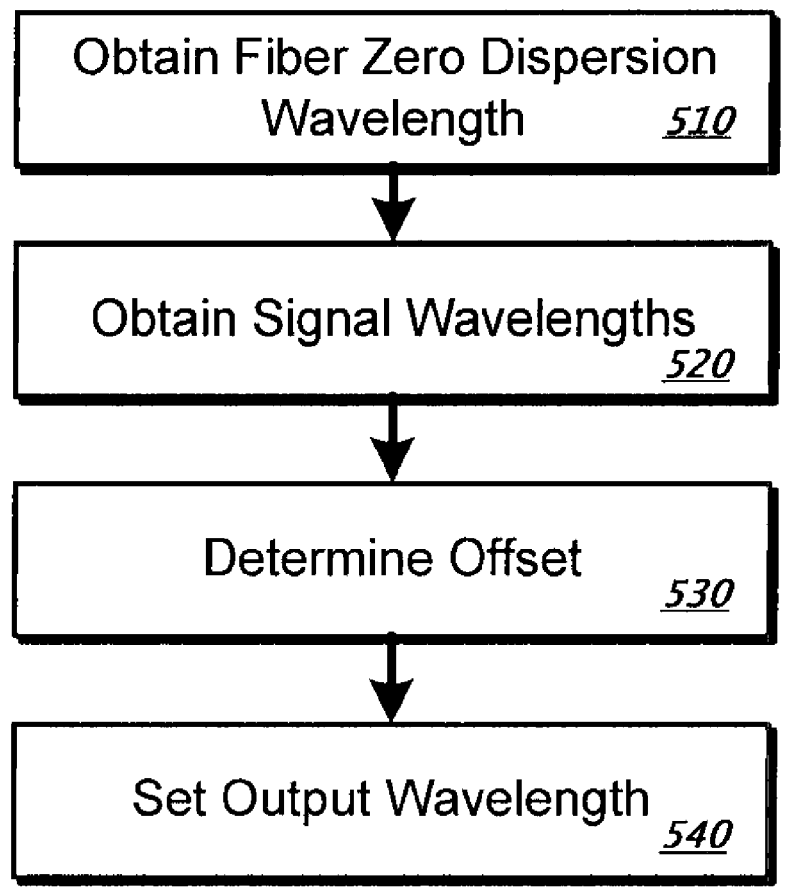
FIG. 5 is a flow chart that illustrates an example process for the suppression of four wave mixing.

FIG. 5 is a flow chart that illustrates an example process 500 that uses tables of data for the suppression of four wave mixing. In some implementations, the process 500 may be executed as part of an installation, maintenance, or other task associated with optical communication systems. In some implementations, the process 500 may be executed by a controller included in an optical transmitter (e.g., the controller 114a included in the optical transmitter 102a of FIG. 1), or by a computer or other device in communication with the transmitter.

The process 500 may include obtaining a fiber zero dispersion wavelength (510). In some implementations, the fiber zero dispersion wavelengths of various optical fibers are stored as a database, a table, a list, or other data store, and the stored fiber zero distortion wavelengths can be used to obtain a fiber zero dispersion wavelength (510).

The wavelengths of two or more optical signals may be obtained, for example, from the user, to configure optical signal wavelength information (520). The obtained wavelengths may be compared to the obtained zero dispersion wavelength data to determine one or more wavelength offsets (530). The determined offset data may be used to set an output wavelength (540) of an optical transmitter. For example, the user may indicate that an optical signal is to be transmitted at 1310-nm across an optical fiber that has a zero dispersion wavelength of 1310-nm, and the process 500 may determine that an offset of 0.1 nm should be used to adjust the output wavelength to 1310.1 nm.

Figure 6:
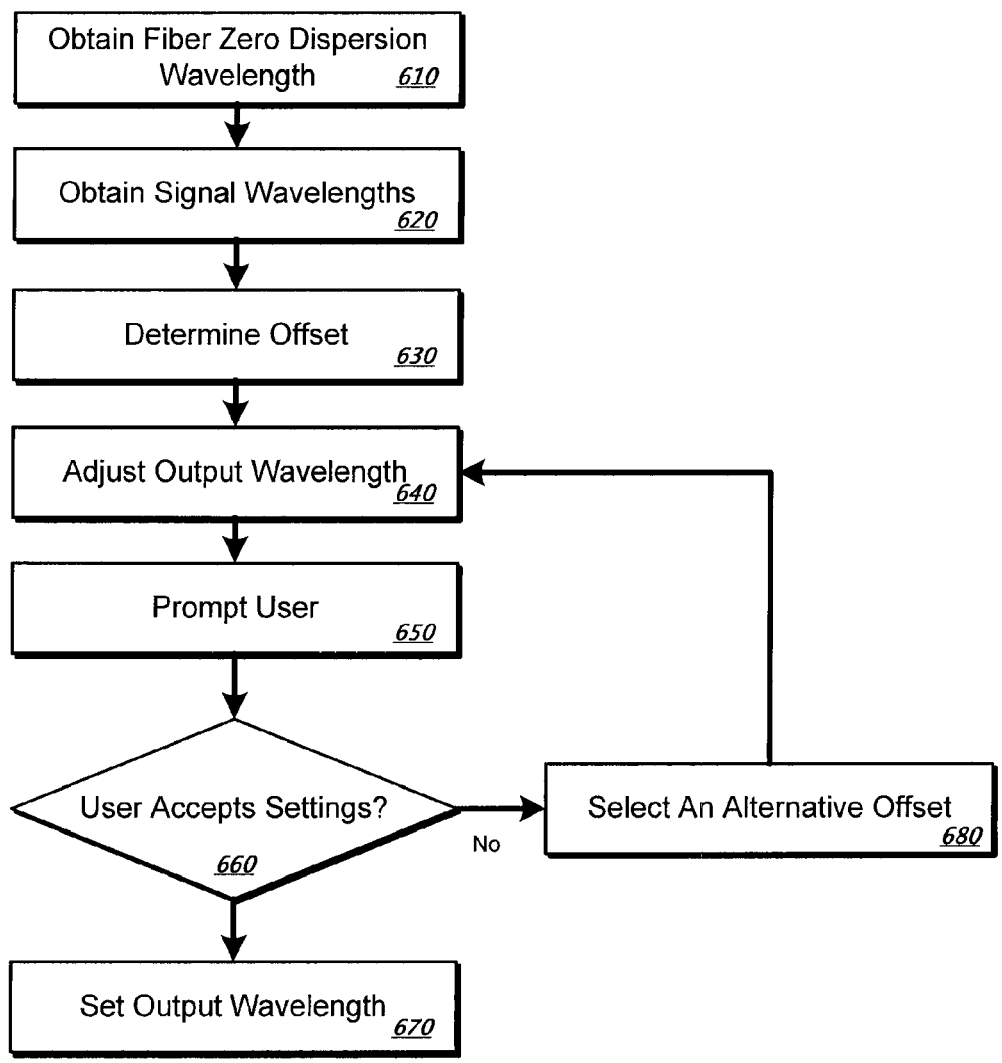
FIG. 6 is a flow chart that illustrates an example process that uses tables of data for the suppression of four wave mixing.

FIG. 6 is a flow chart that illustrates an example process that uses tables of data for the suppression of four wave mixing. In some implementations, the process 600 may be executed as part of an installation, maintenance, or other task associated with optical communication systems. In some implementations, the process 600 may be executed by a controller included in an optical transmitter (e.g., the controller 114a included in the optical transmitter 102a of FIG. 1), or by a computer or other device in communication with the transmitter.

The process 600 may include obtaining a fiber zero dispersion wavelength (610). In some implementations, the fiber zero dispersion wavelength may be provided by the user. For example, the user may know the fiber dispersion wavelength from prior experience, and provide that wavelength information to the process 600. In another example, the user may obtain the fiber dispersion wavelength from a book, table, data sheet, list or other reference for zero dispersion wavelengths, and provide that wavelength information to the process 600. In yet another example, the user may obtain the fiber dispersion wavelength from a display or user interface that is provided by an optical transmitter, and provide that wavelength information to the process 600.

In other implementations, the fiber zero dispersion wavelength may be obtained from a table, list, database, or other data store of zero dispersion wavelengths for various types of optical fibers. For example, the process 600 may access a database that includes zero dispersion wavelength data for a substantial number of commercially available optical fibers, and look up a zero dispersion wavelength for the type of optical fiber through which the system 100 is connected.

The wavelengths of two or more optical signals may be obtained, for example, from the user, from default settings, from a database, or from another source of optical signal wavelength information (620). The obtained wavelengths may be compared to the obtained zero dispersion wavelength data to determine one or more wavelength offsets (630). The determined offset data may be used to adjust an output wavelength (640). For example, the user may indicate that an optical signal is to be transmitted at 1311-nm across an optical fiber that has a zero dispersion wavelength of 1311-nm, and the process 600 may determine that an offset of 0.2 nm should be used to adjust the output wavelength to 1310.8 nm.

The user may be prompted to accept the offset wavelength output settings (650). In some implementations, the user may determine whether to accept the offset wavelength output settings by measuring the results of the settings with an optical power measurement instrument (e.g., optical spectrum analyzer) and comparing the results against a baseline output (e.g., non-offset wavelength). In some implementations, the prompt may include optical power data that the user may interpret to determine whether to accept the offset wavelength output settings.

Based on the prompt, the user may determine whether to accept the proposed settings (660). If the user accepts the proposed settings, then the output wavelength may be set according to the offset output wavelength settings (670). If the user does not accept the settings, an alternative offset may be selected and the alternative offset may be used to adjust the output wavelength (680).

Figure 7:
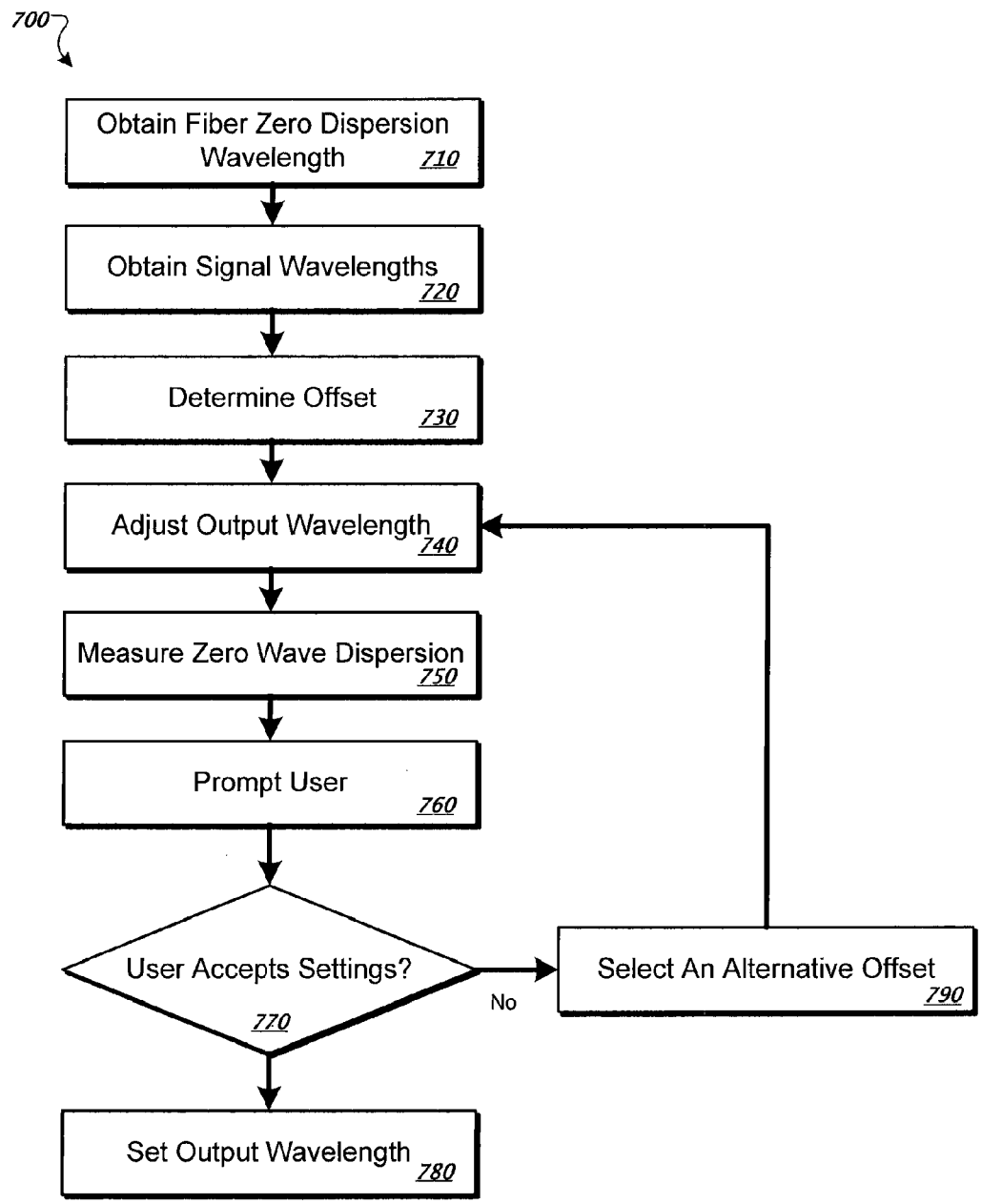
FIG. 7 is a flow chart that illustrates an example process that includes a measurement process for suppression of four wave mixing.

FIG. 7 is a flow chart that illustrates an example process 700 that includes a measurement process for suppression of four wave mixing. In some implementations, the process 700 may be executed as part of an installation, maintenance, or other task associated with optical communication systems. In some implementations, the process 700 may be executed by a controller included in an optical transmitter (e.g., the controller 114a included in the optical transmitter 102a of FIG. 1), or by a computer or other device in communication with the transmitter.

The process 700 may include obtaining a fiber zero dispersion wavelength (710). In some implementations, the fiber zero dispersion wavelength may be provided by the user, a database, a list of zero dispersion wavelengths, a display or user interface, or other source of wavelength data, and provide that wavelength information to the process 700.

The wavelengths of two or more optical signals may be obtained, for example, from the user, from default settings, from a database, or from another source of optical signal wavelength information (720). The obtained wavelengths may be compared to the obtained zero dispersion wavelength data to determine one or more wavelength offsets (730). The determined offset data may be used to adjust an output wavelength (740). For example, the user may indicate that an optical signal is to be transmitted at 1310-nm across an optical fiber that has a zero dispersion wavelength of 1310-nm, and the process 700 may determine that an offset of 0.1 nm should be used to adjust the output wavelength to 1309.9 nm.

The amount of zero wave dispersion that arises from the adjusted output wavelengths (740) is measured (750). In some embodiments, the measurement (750) is performed by an optical measurement device (e.g., optical spectrum analyzer) included in an optical transmitter (e.g., the optical transmitter 102a of FIG. 1), or by an optical measurement device in communication with the transmitter.

The user may be prompted to accept the offset wavelength output settings (760). In some implementations, the prompt (760) includes the zero wavelength distortion information that was previously measured (750). In some implementations, the user may determine whether to accept the offset wavelength output settings by comparing the measured (750) results against a baseline output (e.g., non-offset wavelength). In some implementations, the prompt may include optical power data that the user may interpret to determine whether to accept the offset wavelength output settings.

Based on the prompt, the user may determine whether to accept the proposed settings (770). If the user accepts the proposed settings, then the output wavelength may be set according to the offset output wavelength settings (780). If the user does not accept the settings, an alternative offset may be selected and the alternative offset may be used to adjust the output wavelength (790).

Generic Computer System

Figure 8:
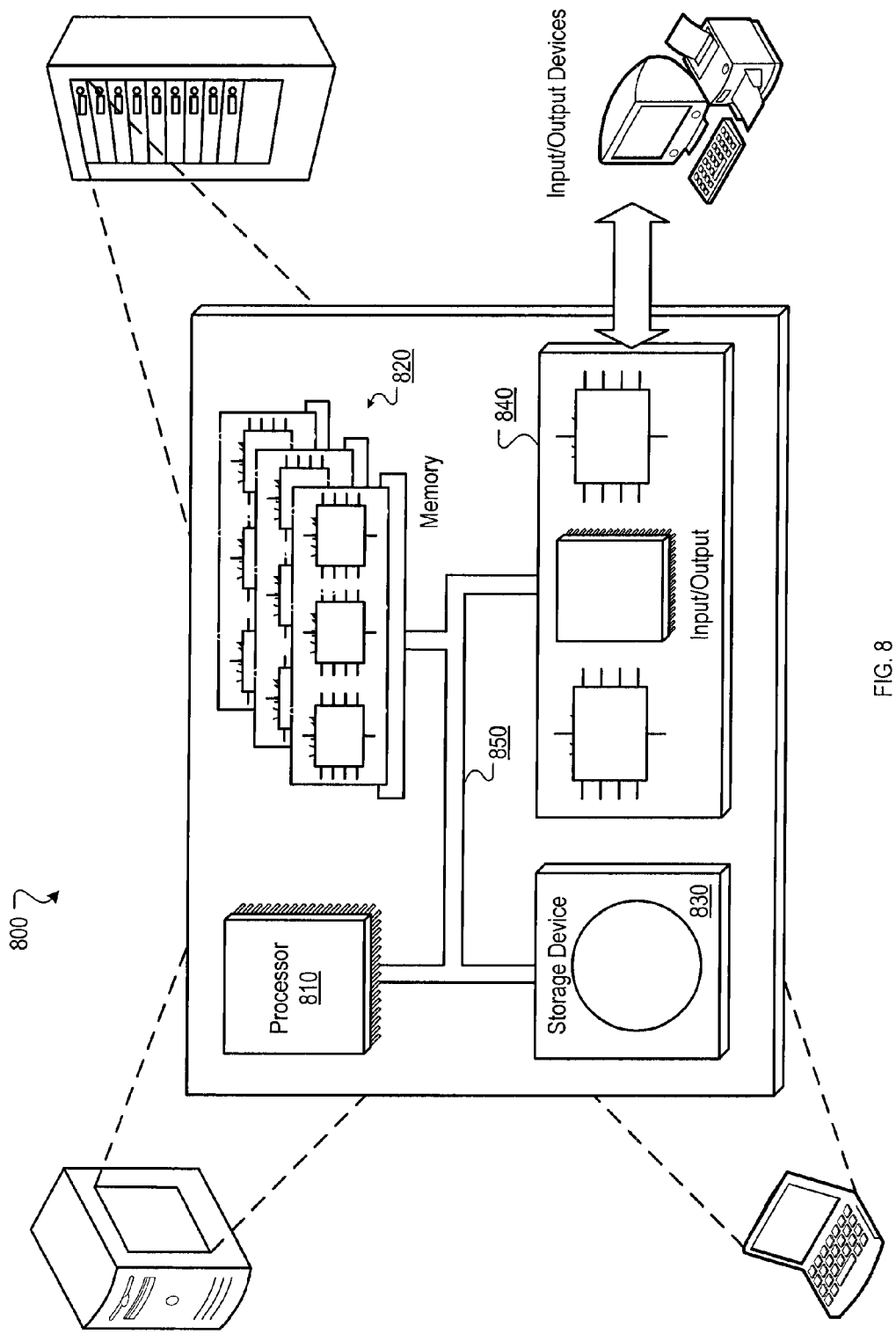
FIG. 8 is a block diagram of computing devices and systems that may be used and implemented to perform operations associated with the suppression of four wave mixing.

Referring now to FIG. 8, a schematic diagram of an example computer system 800 is shown. The system 800 can be used for the operations described in association with the processes 500, 600, and/or 700 shown in FIGS. 5-7, according to one implementation. For example, the processing modules 110a-110c or the controllers 114a-114c may be implemented to include system 800.

As shown in FIG. 8, the system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840. In some embodiments, a parallel processing set of systems 800 connected over a network may be employed, clustered into one or more server centers.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

In some implementations, the memory 820 and/or the storage device 830 can be used to store computer programs, instructions, configuration data, or other information that can be used as part of a process for suppressing four wave mixing. For example, the memory 820 and/or the storage device 830 can be used to store programs or other instructions to carry out a process such as the process 500, 600, and/or 700 shown in FIGS. 5-7. In some examples, the memory 820 and/or the storage device 830 can be used to store and/or retrieve offset data that can be used to suppress four wave mixing by determining wavelength offsets that can be used to offset various optical wavelengths transmitted through various types and/or lengths of optical fibers.

The input/output device 840 provides input/output operations for the system 800. In one implementation, the input/output device 840 includes a keyboard and/or pointing device. In another implementation, the input/output device 840 includes a display unit for displaying graphical user interfaces. For example, the input/output device 840 can provide a user with various options for optical transmission wavelengths, offsets, optical fiber types, transmission distances, or other options that can be used to offset one or more transmission wavelengths to suppress four wave mixing.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

A number of implementations have been described. Nevertheless, it will be understood that various modifications may be made. For example, the optical transmitters may be arranged in a ring, bus or star configuration. Also, the steps or operations recited in the claims can be performed in a different order and still achieve desirable results. Accordingly, other implementations are within the scope of the following claims. As another example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
retrieving a first wavelength from storage;
receiving an input specifying a second wavelength;
determining, by a processor, a desired wavelength offset based on the first wavelength and the second wavelength, including:
identifying a model for determining the desired wavelength offset based on one or more design parameters, and
identifying the desired wavelength offset as a suitable offset that meets the one or more design parameters based at least in part on the model; and
controlling one or more optical parameters of an optical transmitter based on the offset.

2. The method of claim 1, where retrieving a first wavelength includes:
retrieving the first wavelength from a database containing wavelengths associated with a zero-dispersion wavelength range of one or more transmission medium.

3. The method of claim 1, further comprising:
refining the algorithmic model based on an observed rate of change to the one or more design parameters.

4. The method of claim 1, where identifying a suitable offset includes:
receiving an input confirming the suitable offset,
where controlling an operating wavelength of an optical transmitter includes controlling the operating wavelength after receiving the input.

5. The method of claim 4, where receiving an input includes:
prompting a user for a validity of the suitable offset; and
receiving a user input confirming the validity.

6. The method of claim 1, further comprising:
comparing the first wavelength against the second wavelength to determine whether the first wavelength substantially matches the second wavelength,
where determining a desired wavelength offset includes determining the desired wavelength offset only when the first wavelength substantially matches the second wavelength.

7. The method of claim 1, wherein the offset is configured to shift the second wavelength away from the first wavelength.

8. The method of claim 1, wherein the first wavelength is a zero-dispersion wavelength of a transmission medium through which signals of the optical transmitter are transmitted, and the second wavelength is an operating wavelength of the optical transmitter.

9. The method of claim 8, where determining a desired wavelength offset includes:
determining a desired wavelength offset suitable to prevent the alignment of the operating wavelength and the zero-dispersion wavelength.

10. The method of claim 8, where controlling one or more optical parameters of an optical transmitter based on the offset includes:
controlling an output wavelength of the optical transmitting including shifting the operating wavelength of the optical transmitter away from the zero-dispersion wavelength associated with the transmission medium.

11. The method of claim 10, where shifting the operating wavelength of the optical transmitter includes adjusting an operating temperature of the optical transmitter or changing a bias current supplied to the optical transmitter.

12. The method of claim 8, where determining a desired wavelength offset includes:
determining the desired offset empirically based on an observed rate of parameter changes associated with the optical transmitter.

13. The method of claim 1, where determining a desired wavelength offset includes:
accessing a database containing a table comprising a list of discrete wavelength offsets; and
selecting, from the list, a suitable offset which corresponds to at least one of the first wavelength or the second wavelength as the desired wavelength offset.

14. The method of claim 1, further comprising:
prompting a user to determine whether the determined offset is acceptable;
receiving a user input regarding the determined offset; and
adjusting an output wavelength of the optical transmitter based on the determined offset if the determined offset is acceptable to the user.

15. The method of claim 14, further comprising:
selecting an alternative offset if the determined offset is unacceptable to the user;
prompting the user to determine whether the alternative offset is acceptable;
receiving a user input regarding the alternative offset; and adjusting an output wavelength of the optical transmitter based on the alternative offset if the alternative offset is acceptable to the user.

16. The method of claim 1, further comprising:
measuring a dispersion parameter after controlling the one or more optical parameters of an optical transmitter based on the offset;
prompting a user to determine whether the determined offset is acceptable based on the measured dispersion parameter; and
receiving a user input regarding the determined offset.

17. A system comprising:
an optical transmitter for transmitting an optical signal, the optical transmitter including:
a transmitter configured to generate an optical signal and transmit the optical signal through a transmission medium; and
a controller configured to:
identify a zero-dispersion wavelength of the transmission medium;
identify an operating wavelength of the optical transmitter;
compare the operating wavelength with the zero-dispersion wavelength;
determine, based on the comparison, a desired wavelength offset for shifting the operating wavelength away from the zero-dispersion wavelength, including:
identify a model for determining the wavelength offset based on one or more design parameters, and
identify the desired wavelength offset as a suitable offset that meets the one or more design parameters based at least in part on the model; and
determine whether the desired wavelength offset meets a predetermined criterion; and
an optical receiver for receiving the optical signal through the transmission medium.

18. The system of claim 17, wherein the controller instructs a user to enter pass or fail information to determine whether the desired wavelength offset meets a predetermined criterion.

19. The system of claim 18, wherein, if the user has entered pass information, the controller controls the transmitter to effectuate the desired wavelength offset.

20. The system of claim 18, wherein, if the user has entered fail information, the controller continues to identify one or more wavelength offsets until a point at which the desired wavelength offset meets the predetermined criterion.

21. The system of claim 17, wherein the desired wavelength offset is determined empirically based on an observed rate of system degradation.

22. The system of claim 17, further comprising a database that includes
a library containing values or ranges of dispersion-zero wavelengths associated with one or more transmission mediums; and
a table comprising a list of discrete wavelength offsets.

23. The system of claim 22, wherein the controller identifies the zero-dispersion wavelength by searching for a corresponding transmission medium in the library.

24. The system of claim 23, wherein the controller determines the desired wavelength offset by accessing the table to identify a wavelength offset that meets the predetermined criterion.

25. The system of claim 17, wherein the one or more parameters include power, wavelength, amplitude and offset of a wavelength or between wavelengths.

26. The system of claim 17, wherein the optical transmitter further comprises:
a signal processing module configured to provide an electrical signal to the transmitter, the transmitter being configured to generate the optical signal based on the electrical signal.

27. An optical transmitter comprising:
a controller configured to:
identify a zero-dispersion wavelength of a transmission medium through which signals of the optical transmitter are transmitted;
identify an operating wavelength of the optical transmitter;
compare the operating wavelength with the zero-dispersion wavelength;
determine, based on the comparison, a desired wavelength offset for shifting the operating wavelength away from the zero-dispersion wavelength, including:
identify a model for determining the wavelength offset based on one or more design parameters, and
identify the desired wavelength offset as a suitable offset that meets the one or more design parameters based at least in part on the model; and
control an output wavelength of the optical transmitter based on the desired wavelength offset.

28. A computer-readable medium having instructions stored thereon, which, when executed by a processor, causes the processor to perform operations comprising:
a processor;
a computer-readable medium operatively coupled to the processor and including instructions, which, when executed by the processor, causes the processor to perform operations comprising:
identify a zero-dispersion wavelength of a transmission medium through which signals of an optical transmitter are transmitted;
identify an operating wavelength of the optical transmitter;
compare the operating wavelength with the zero-dispersion wavelength;
determine, based on the comparison, a desired wavelength offset for shifting the operating wavelength away from the zero-dispersion wavelength, including:
identify a model based for determining the wavelength offset on one or more design parameters, and
identify the desired wavelength offset as a suitable offset that meets the one or more design parameters based at least in part on the model; and
control an output wavelength of the optical transmitter based on the desired wavelength offset.

* * * * *